United States Patent [19]

Moore

[11] Patent Number: 4,597,973

[45] Date of Patent: Jul. 1, 1986

[54] PROCESS FOR TREATING EDIBLE NUTS AND SEEDS

[76] Inventor: James H. Moore, 6700 A Filbro Dr., Gilroy, Calif. 95020

[21] Appl. No.: 761,873

[22] Filed: Aug. 2, 1985

[51] Int. Cl.$^4$ ................................................ A23L 1/36
[52] U.S. Cl. ...................................... 426/93; 426/309; 426/632; 426/629
[58] Field of Search .................. 426/309, 93, 632, 629

[56] References Cited

U.S. PATENT DOCUMENTS

| | | | |
|---|---|---|---|
| 1,505,605 | 8/1924 | Sawkins | 426/632 |
| 1,832,737 | 11/1931 | Rassi | 426/632 |
| 1,911,869 | 10/1934 | Zaloom | 426/632 |
| 1,972,443 | 9/1934 | Halabi et al. | 426/632 |
| 2,278,941 | 4/1942 | Musher | 426/632 |
| 2,643,190 | 6/1953 | Hegeman | 426/93 |
| 3,134,677 | 5/1964 | Glabe | 426/629 |
| 3,314,800 | 4/1967 | Noznick et al. | 426/632 |
| 4,522,833 | 6/1985 | Sharma | 426/309 |

*Primary Examiner*—Jeanette Hunter
*Attorney, Agent, or Firm*—Norman B. Rainer

[57] ABSTRACT

Edible seeds and nuts having been stored at low preserving temperatures are treated so as to produce a roasted, salted product wherein the salt is strongly held without the use of oil additives. The process utilizes temperature-conditioning storage, a heat treatment which expands surface cells, spray treatment with an unsaturated sodium chloride solution, followed by roasting.

5 Claims, No Drawings

PROCESS FOR TREATING EDIBLE NUTS AND SEEDS

BACKGROUND OF THE INVENTION

This invention relates to a process for roasting and salting edible nuts and seeds.

The usual present commercial process for roasting nuts is to roast them in oil, such as cottonseed or other oil, after which they are salted and packed. A thin film of oil adheres the salt to the nut. Nuts treated in such manner further require chemical preservatives that will prevent rancidity. Also, such nuts are not usually uniformly salted, inasmuch as some of the salt adhered thereto will drop off, and portions of the nut having received excessive oil will retain greater amounts of salt. Furthermore, the oil adversely affects crispness and flavor, and constitutes an additive ingredient of foreign origin with respect to the treated nut.

U.S. Pat. No. 2,643,190 describes a process for applying salt to nuts by immersing the nuts in a heated salt solution, followed by roasting in a pressurized vessel. Although such process avoids the use of oil additives, it involves an expensive batch-wise operation and specialized equipment capable of withstanding pressures of at least 210 pounds per square inch.

It is accordingly an object of the present invention to provide a process for roasting and applying salt to nuts without use of oil additives or high pressure conditions.

It is another object of this invention to provide a process as in the foregoing objective which achieves improved uniformity of the resultant treated nuts.

It is a further object of the invention to provide a process of the aforesaid nature wherein the salt becomes more strongly attached to the nuts.

It is yet another object of this invention to provide an economical process of the aforesaid nature which does not require use of preservatives, and yields a crisp product having good flavor.

These objects and other objects and advantages of the invention will be apparent from the following description.

SUMMARY OF THE INVENTION

The above and other beneficial objects and advantages are accomplished in accordance with the present invention by a process comprising:
(a) storing the nuts in a conditioned environment having a temperature in the range of about 45 degrees F. to 55 degrees F. for sufficient time that the temperature of substantially each nut is uniform between its center and surface,
(b) uniformly heating the conditioned nuts with heated air so as to cause the surface cells of the nuts to expand,
(c) spraying the still hot nuts uniformly with an unsaturated solution of sodium chloride in water, said solution having a temperature in the range of 78 degrees F. to 95 degrees F., the amount of sodium chloride thereby applied being between about 3 and 100 milligrams per ounce of the heated nuts, and
(d) roasting the sprayed nuts at a temperature in the range of 275 degrees F. to 380 degrees F. to produce a final nut product having a moisture content in the range of 1.90% to 2.5%.

DESCRIPTION OF THE PREFERRED EMBODIMENT

Raw nuts and seeds, generally having been stored at low preserving temperatures, are placed in open bins in layers having a depth between about 24 and 48 inches. Air having a temperature in the range of 78 degrees F. to 95 degrees F. is circulated around and through the bins for about 24 hours. Such treatment produces a conditioned nut product wherein the temperature of substantially each nut is uniform between its center and surface. In the absence of the conditioning treatment, the nuts will undergo internal scorching during the subsequent heat treatment.

The conditioned nuts are subsequently subjected to treatment with heated air which causes the surface cells of the nuts to expand. Although the air temperature and time of exposure will vary with each nut or seed product because of its size and cellular structure, air temperatures will generally be in the range of 265 degrees F. to 290 degrees F., and exposure times will generally be in the range of 3 to 8 minutes. The heated nuts, having a slightly expanded surface, are highly permeable to a sodium chloride solution, especially when the nuts are still at an elevated temperature at the instant of application of the solution.

In the course of the spraying of the heated nuts, the concentration of the salt solution and its delivery rate are held uniform. The solution is directed from compressed air spray nozzles downwardly onto the nuts held in a revolving pan; the nuts having been fed onto said pan from a controlled weighing feeder. The exact amount of salt solution is critically chosen such that total absorption rapidly occurs without run-off. Under such conditions, the salt deposited onto the nuts is tenaciously held and the subsequent roasting step is easily accomplished to produce a crisp or crunchy product.

Nuts and seeds susceptible to improvement by the process of this invention are free of an intact inedible outer shell. Typical species include nuts such as almond, pecan, walnut, peanut, pistashio, macadamia, hazel, brazil, cashew, and seeds such as pumpkin, and sunflower.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A treatment process for edible nuts and seeds having been stored at low preserving temperature comprising:
(a) removing nuts from a low temperature storage facility,
(b) storing the nuts in a conditioned environment having a temperature in the range of 45 degrees F. to 55 degrees F. for sufficient time that the temperature of substantially each nut is substantially uniform between its center and surface,
(c) uniformly heating the conditioned nuts with heated air so as to cause the surface cells of the nuts to expand,
(d) spraying the still hot nuts uniformly with an unsaturated solution of sodium chloride in water, said solution having a temperature in the range of 78 degrees F. to 95 degrees F., the amount of sodium chloride thereby applied being between about 3 and 100 milligrams per ounce of the heated nuts, and roasting the sprayed nuts at a temperature in the range of 275 degrees F. to 380 degrees F. to produce a final nut product having a moisture content in the range of 1.9% to 2.5%.

2. The process of claim 1 applied to seeds.

3. The process of claim 1 wherein the heat treatment that causes expansion of surface cells is conducted at a temperature in the range of 265 degrees F. to 290 degrees F. for a time duration between about 3 and 8 minutes.

4. The process of claim 1 wherein the amount of sodium chloride solution sprayed onto the nuts is such that total absorption rapidly occurs without run-off.

5. The process of claim 1 wherein said nuts and seeds are free of an intact inedible outer shell.

* * * * *